(12) United States Patent
Grafe et al.

(10) Patent No.: US 7,117,776 B1
(45) Date of Patent: Oct. 10, 2006

(54) HIGH-SPEED SHEAR FOR TRANSVERSE CUTTING OF A ROLLED STRIP

(75) Inventors: Horst Grafe, Hilchenbach (DE); Jürgen Merz, Krueztal (DE)

(73) Assignee: SMS Demag AG, Dusseldorf (DE)

( * ) Notice: Subject to any disclaimer, the term of this patent is extended or adjusted under 35 U.S.C. 154(b) by 0 days.

(21) Appl. No.: 09/710,390

(22) Filed: Nov. 9, 2000

(30) Foreign Application Priority Data

Nov. 10, 1999 (DE) .................. 199 53 908

(51) Int. Cl.
B23D 25/12 (2006.01)

(52) U.S. Cl. .................. 83/287; 83/303; 83/306; 83/343; 83/436.15

(58) Field of Classification Search .......... 83/311, 83/343, 344, 287, 288, 295, 303, 436.15, 83/175, 176, 418, 304, 305, 306, 445, 446, 83/355, 105; 193/35 SS
See application file for complete search history.

(56) References Cited

U.S. PATENT DOCUMENTS

| | | | | |
|---|---|---|---|---|
| 2,059,187 A * | 10/1936 | Talbot | ................ | 83/305 |
| 2,076,969 A * | 4/1937 | Sieger | ................ | 83/305 |
| 2,588,581 A * | 3/1952 | Sieger | ................ | 83/303 |
| 3,037,396 A * | 6/1962 | Martin | ................ | 83/305 |
| 3,099,181 A * | 7/1963 | Hergenhan | ................ | 83/421 |
| 3,543,620 A * | 12/1970 | Hilsenbeck | ................ | 83/37 |
| 3,882,745 A * | 5/1975 | Garrett et al. | ................ | 83/311 |
| 3,948,126 A * | 4/1976 | Wolfberg et al. | ................ | 83/37 |
| 4,062,259 A * | 12/1977 | Sclippa | ................ | 83/285 |
| 4,240,312 A * | 12/1980 | Ward, Sr. | ................ | 83/311 |
| 4,328,727 A * | 5/1982 | Tokuno | ................ | 83/106 |
| 4,480,516 A * | 11/1984 | Leroy | ................ | 83/98 |
| 4,548,112 A * | 10/1985 | Thomas | ................ | 83/345 |
| 4,667,551 A * | 5/1987 | Kuromaru et al. | ................ | 83/72 |
| 4,785,696 A * | 11/1988 | Martiny | ................ | 83/152 |
| 4,809,573 A * | 3/1989 | Welch | ................ | 83/37 |
| 5,152,205 A * | 10/1992 | Yoshida et al. | ................ | 83/304 |
| 5,207,138 A * | 5/1993 | Sato et al. | ................ | 83/337 |
| 5,662,018 A * | 9/1997 | Klein | ................ | 83/343 |
| 5,857,370 A * | 1/1999 | Grenz et al. | ................ | 72/203 |
| 5,983,764 A * | 11/1999 | Hillebrand | ................ | 83/305 |

FOREIGN PATENT DOCUMENTS

| | | |
|---|---|---|
| DE | 2654866 | 6/1977 |
| DE | 9746528 | 10/1997 |
| EP | 0904877 | 3/1999 |

* cited by examiner

Primary Examiner—Timothy V. Eley
Assistant Examiner—Jason Prone
(74) Attorney, Agent, or Firm—Abelman, Frayne, Schwab

(57) ABSTRACT

A high-speed shear for cutting a rolled strip to a length and including first upper and second lower blade drums carrying, respectively first and second blades and rotationally connected with each other, drive elements located in front of and behind the first and second drums for advancing the rolled strip, under longitudinal tensioning, through a blade gap between the first and second drums, and support rollers supporting the tensioned strip and providing for lifting of the strip before passing of the second blade and for lowering the strip before passing of the first blade through the blade gap.

1 Claim, 3 Drawing Sheets

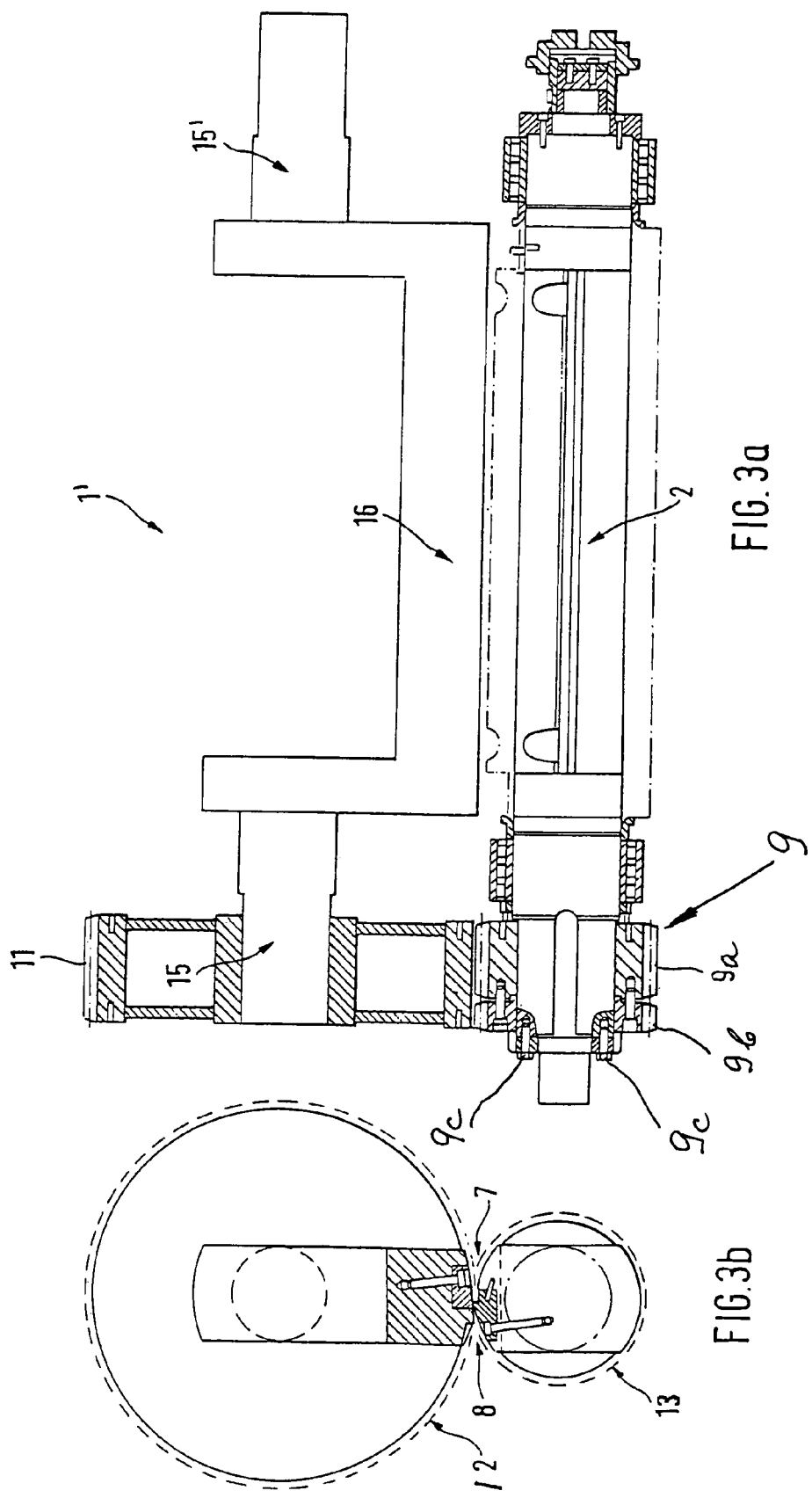

HIGH-SPEED SHEAR FOR TRANSVERSE
CUTTING OF A ROLLED STRIP

BACKGROUND OF THE INVENTION

1. Field of the Invention

The present invention relates to a high-speed shear for transverse cutting of a rolled strip to a length and including a first upper blade drum having a comparatively large diameter and carrying a first blade, a second lower blade drum having a comparatively small diameter and carrying a second blade, and a drive transmission for rotationally connecting the first and second blade drums, with the first and second blade cooperating with each other in a predetermined cutting position of the first and second blade drums for cutting the rolled strip.

2. Description of the Prior Art

Generally, high-speed shears for transverse cutting a rolled strip to a length are well known. Thus, German Publication DE 197 46 528A discloses a high-speed shear having two drums one of which carries a chisel cutter and the other of which carries an anvil that cooperates with the chisel cutter for cutting the strip. A controlled adjusting device displaces the two drums toward each other for cutting a run-through strip. The synchronization of the displacement of the two drums is effected by using electrical, electronic, and mechanical means.

European Publication EP 0 904 877A2 discloses a high-speed shear with blade drums the diameters and speeds of which differ only insignificantly, and which are driven by an external divider mechanism. The drums are brought into a cutting position, in which the blades are located opposite each other, by a lever-operated setting mechanism and, after cutting the strip, the drums are moved away from each other.

German Publication DE-OS 26 54 866 discloses a flying shear with blade drums rotationally connected with each other. The disclosed shear has a drum rotating device with a force transmitting mechanism that connects the two drums and insures that their speeds are synchronized with the running speed of the fed material. This German Publication further discloses a drum adjusting device for displacing the drums between an open position and a cutting position, and a control unit for controlling the motor of the adjusting device and which controls the displacement of the drums between the open and cutting position.

In the shear disclosed in DE-OS 26 54 866 the ratio of the diameters of the first and second drums in equal 2 to 3, and their rotation is so coordinated that the second drum performs two revolution per three revolution of the first drum. The drum setting or adjusting device is so controlled that the first and second drums are in the cutting position after six revolutions of the first drum and four revolution of the second drum.

As it follows from the disclosure of DE-OS 26 54 866, in particular FIG. 2, the force transmitting mechanism, which connects the drums, the drum adjusting device, and the control unit are very complicated and are failure-prone. The force transmitting mechanism has five tooth gears engaging each other so that the accumulated tooth backlash results in deviation of the angular positions of the blade drums for predetermined positions which can lead to the damage of the shear and also result in an unclean cut.

Accordingly, an object of the present invention is to provide a high-speed shear for cutting hot and/or cold strips which would insure obtaining of a precise cut with the strip being transported with a high speed.

Another object of the present invention is to provide a high-speed shear for cutting hot and/or cold strips which would insure obtaining of a precise cut of strips having minimal thicknesses and transported with high-speeds.

A further object of the present invention is to provide a high-speed shear having a simple structure and non-complicated mechanical and/or electronic mechanisms.

A still further object of the present invention is to provide a high-speed shear in which the danger of the blades or even entire shear being damaged is eliminated.

Yet another object of the present invention is to provide a high-speed shear having reduced mounting and maintenance costs.

SUMMARY OF THE INVENTION

These and other objects of the present invention, which will become apparent hereinafter, are achieved by providing in a high-speed shear of the type described above:

(i) means located in front of and behind the first and second drums for advancing the rolled strips, under longitudinal tensioning, through a gap between the first and second drums, and (ii) roller means for supporting the tensioned strip and providing for lifting of the strip before passing of the second blade and for lowering the strip before passing of the first blade.

In the shear according to the present invention, the drums can be accelerated to the strip advancing speed by an increase of their rotational speed. This is indispensable at large strip speeds, e.g., of order of 20 m/sec and more.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3a a front, partially cross-sectional view of a shear blade drum; and

FIG. 3b a side view of the drum pair according to FIG. 3a.

DETAILED DESCRIPTION OF THE
PREFERRED EMBODIMENT

Figure 1:
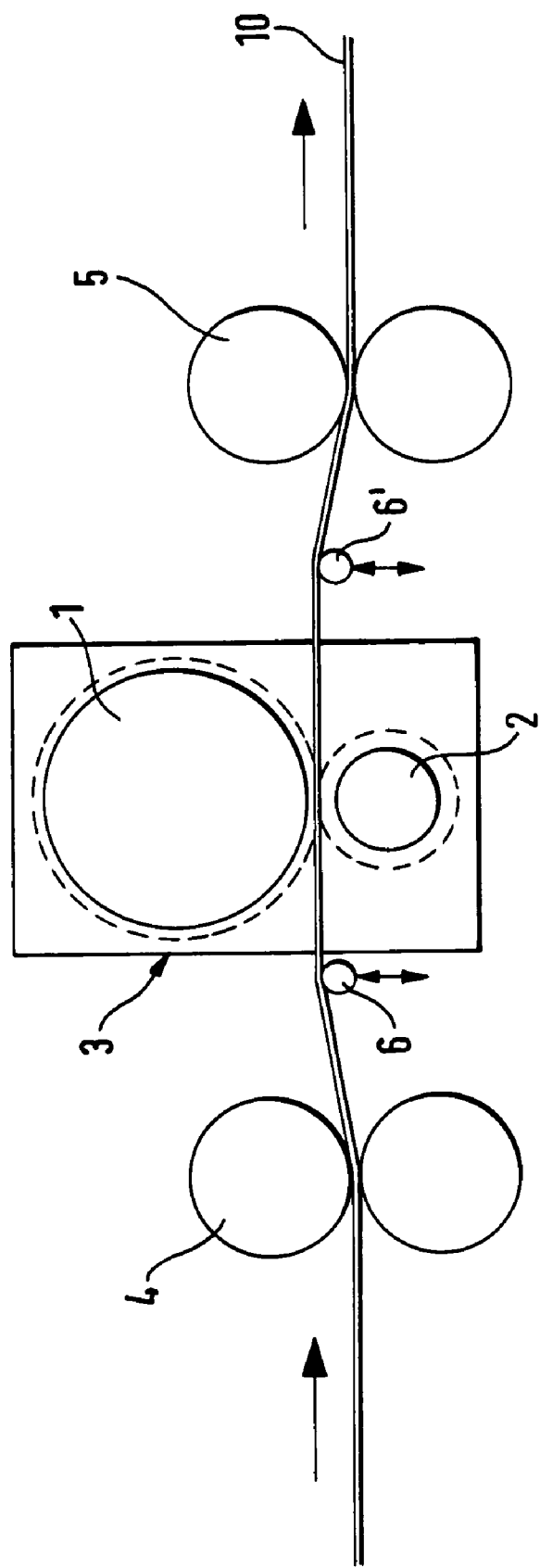
FIG. 1 a schematic view of a high-speed shear according to the present invention.

A high-speed shear according to the present invention for transverse cutting a rolled strip to a length, a schematic view of which is shown in FIG. 1, has a first blade drum 1 having a comparatively large diameter, and a second blade drum 2 having a comparatively small diameter. The first and second blade drums 1 and 2 are rotationally connected by a gear transmission (not shown) so that a number of X-revolutions of the first blade drum 1 corresponds to a number of Y-revolutions of the second blade drum 2, whereby the first and second blade drums 1 and 2 are brought into a cutting position after different but finite numbers of X-revolutions and Y-revolutions, respectively.

According to the invention, the blade drums 1 and 2 are fixedly secured in respective bearing supports in a shear frame 3. The shear further includes pinch-roller sets 4, 5, which are arranged in front and behind the blade drum pair 1 and 2 for advancing the strip 10, under longitudinal tensioning, through a gap between the first and second blade drums 1 and 2. The shear also has support rollers 6, 6' for supporting the strip 10 during its advance. The support rollers 6, 6' lift the strip 10 before the lower blade 7 (FIG. 3b) passes and lowers the strip 10 when the upper blade 8 passes through the cutting position.

The foregoing measures insure in a simple manner that during an "idle run" of the upper, first blade drum 1 and the lower, second blade drum 2, corresponding blades 7 and 8 do not contact the strip 10. To this end, there is provided a corresponding electrical, electronic, or mechanical repeating and synchronization device for displacing the support rollers to 6, 6' to effect lifting or lowering of the strip 10.

According to an embodiment of the present invention, which is shown in FIG. 3a, the first and second blade drums 1 and 2 are fixedly connected with synchronization tooth gears 9, 11, respectively, having respective diameters roughly corresponding to the blade diameters 12, 13 of respective blades 7, 8. The synchronization gears 9, 11 engage each other backlash-free.

Obviously, as per se known, the first and second blade drums 1, 2 can be connected with respective drive shafts by a transmission (not shown) which would provide a different transmission ratio than the synchronization gears 9, 11.

As shown in the drawings, in the first upper blade drum 1, on which the upper blade 8 is mounted, the radial distance from the drum rotational axis to the drum periphery opposite the blade diameter 12 is noticeably smaller than the radial distance from the drum rotational axis to the drum periphery having the blade diameter 12. Therefore, the shear can be brought into a position in which a large opening or gap is formed between the drum 1 and the upper edge of the roll table along which the strip 10 is advanced. A large opening is needed, during entering and passing through of the strip head, as the strip head, for bending up of the front end, is inclined, in a manner of a ski, and with a smaller gap, the strip can be damaged in the region of the shear.

In order to reliably prevent such a possibility, the upper drum 1 is replaced with a blade beam support 1' having the same blade diameter 12. The blade beam support 1' is formed as a beam bridge 16 with two opposite shaft stubs 15, 15', as shown in FIG. 3a.

There is further provided per se known, hydraulic or mechanical drive or adjusting means for displacing the support rollers 6, 6' and the operation of which is synchronized with passing of the upper and lower blades 8, 7 through the blade gap between the drums 1 and 2. This means insures upward and downward displacement of the support rollers 6, 6' together with the tensioned strip 10 supported thereon. Due to the elevated arrangement of the support rollers 6, 6' which can be seen in FIG. 1, the strip 10 is supported thereon under a compressive strain, which insures that the strip 10 can follow the support rollers 6, 6', during the downward movement of the support rollers 6, 6' without any problem.

According to a further advantageous embodiment of the inventive shear, instead of the blades 7, 8, there are provided, preferably a cutting bit on the upper drum 1 and an anvil on the lower drum 2. The advantage of providing a cutter bit and an anvil consists in that the tolerances in the relative angular positions of the cutter bit and the anvil do not adversely affect the quality of the cut, and a clean and burr-free cut is obtained.

According to the present invention, the drums 1 and 2 are rotationally preloaded with respect to each other and/or the tooth backlash of the gears 9, 10 is minimized and/or compensated. E.g., the tooth gear 9, which is formed as a pinion, can be radially divided, and respective portions can be rotationally preloaded relative to each other in order to compensate the tooth backlash.

To this end, in per se known manner, the tooth gear 9, which is associated with the second lower drum 2, is formed of two gear portions 9a and 9b. For eliminating the backlash, the gear portions 9a, 9b are rotated relative to each other by a fraction of an angle and are secured to each other with bolts 9c.

Figure 2:
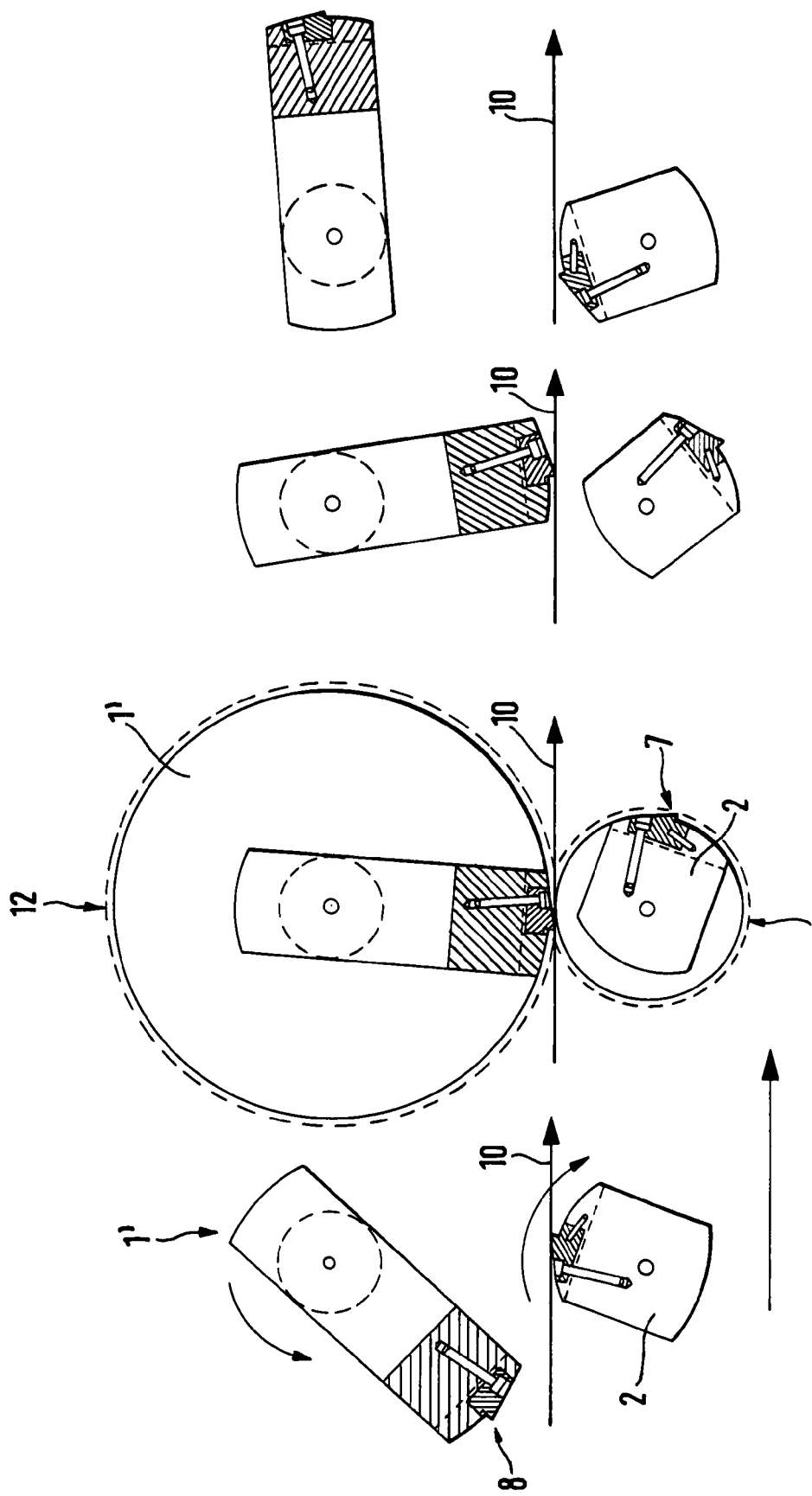
FIG. 2 a side view of a shear drum pair in different angular positions during their rotational movement.

FIG. 2 shows different phases of positions of the blade supports 1', 2, which rotate with different speeds, relative to each other. Only once, they occupy a cutting position, which is determined by a transmission ratio defined by a predetermined number of revolutions of each of the drums 1' and 2, and, thus, provide a gap, after or before the cut, for the rolled strip 10.

Due to the obtained transmission ratio between the two drums 1, 2, in an acceleration phase of rotation of the two drums 1, 2, an increase of their speeds to that of the advancing speed of the rolled strip, before the cut step, up to their cut position became possible.

Though the present invention was shown and described with references to the preferred embodiments, such are merely illustrative of the present invention and are not to be construed as a limitation thereof and various modifications of the present invention will be apparent to those skilled in the art. It is there not intended that the present invention be limited to the disclosed embodiments or details thereof, and the present invention includes all variations and/or alternative embodiments within the spirit and scope of the present invention as defined by the appended claims.

What is claimed is:

1. High-speed shears for transverse cutting of a rolled strip comprising:
   an upper blade support formed as a beam bridge having a relatively large diameter and carrying a first blade and having a shaft stub on each of opposite longitudinal sides thereof;
   a lower blade drum having a comparatively small diameter and carrying a second blade;
   means for permanently rotationally connecting the beam bridge with the lower drum and having two synchronization tooth gears fixedly connected with the beam bridge and the blade drum, respectively, having different pitch circle diameters corresponding roughly to diameters of respective blades, and engaging each other substantially backlash-free, the first and second blades cooperating with each other in a predetermined cutting position of the beam bridge and the lower blade drum for cutting the rolled strip;
   two pinch-roller sets located in front of and behind the beam bridge and the blade drum, respectively, for advancing the rolled strip under longitudinal tensioning through a gap between the beam bridge and the blade drum; and
   roller means for supporting the tensioned strip and providing for lifting of the strip before passing of the second lower blade and for lowering the strip before passing of the first upper blade through the blade gap,
   wherein in order to at least minimize the backlash, the tooth gear associated with the blade drum is divided in two gear portions, and the shear further comprises bolt means for securing the two gear portions in a predetermined angular position with respect to each other,
   wherein a number of x-revolutions of the beam bridge corresponds to a number y-revolutions of the blade drum so that the beam bridge and the blade drum are brought into the cutting position after different but finite number of the x-revolutions of the beam bridge and the y-revolutions the blade drum.

* * * * *